(12) United States Patent
Aranda et al.

(10) Patent No.: US 8,752,781 B2
(45) Date of Patent: Jun. 17, 2014

(54) SEAT BELT RETRACTOR WITH DEACTIVATABLE LOCKING SYSTEM

(75) Inventors: Guillem Aranda, Hamburg (DE); Volkmar Heine, Hamburg (DE)

(73) Assignee: Autoliv Development AB, Värgäda (SE)

( * ) Notice: Subject to any disclaimer, the term of this patent is extended or adjusted under 35 U.S.C. 154(b) by 561 days.

(21) Appl. No.: 13/063,556

(22) PCT Filed: Oct. 15, 2009

(86) PCT No.: PCT/EP2009/007395
§ 371 (c)(1),
(2), (4) Date: Mar. 11, 2011

(87) PCT Pub. No.: WO2010/046053
PCT Pub. Date: Apr. 29, 2010

(65) Prior Publication Data
US 2011/0163194 A1    Jul. 7, 2011

(30) Foreign Application Priority Data
Oct. 21, 2008 (DE) .......................... 10 2008 052 563

(51) Int. Cl.
*B60R 22/405* (2006.01)
*B60R 22/41* (2006.01)
*B60R 22/353* (2006.01)

(52) U.S. Cl.
USPC .................. 242/383.1; 242/382.2; 242/383.2; 242/384.1

(58) Field of Classification Search
USPC .......... 242/382.1, 382.2, 383.1, 383.2, 384.1; 280/806, 807; 297/476, 478
See application file for complete search history.

(56) References Cited

U.S. PATENT DOCUMENTS

| | | | | |
|---|---|---|---|---|
| 3,711,037 A | * | 1/1973 | Jakob | 242/383.1 |
| 4,763,853 A | * | 8/1988 | Andersson | 242/383.1 |
| 4,817,885 A | * | 4/1989 | Matsumoto | 242/382.2 |
| 4,834,313 A | * | 5/1989 | Tsukamoto | 242/383.1 |
| 4,993,656 A | * | 2/1991 | Tsuge et al. | 242/383.1 |
| 5,826,813 A | | 10/1998 | Hibata | |
| 2001/0038054 A1 | | 11/2001 | Mori et al. | |
| 2004/0195422 A1 | * | 10/2004 | Fleischmann et al. | 242/382.2 |

FOREIGN PATENT DOCUMENTS

| | | |
|---|---|---|
| EP | 0 811 535 B1 | 6/1997 |
| WO | WO 88/04245 | 6/1988 |
| WO | WO2008/064870 | 6/2008 |

OTHER PUBLICATIONS

PCT/EP09/007395—International Search Report—Jan. 18, 2010.
Search Report—Aug. 31, 2009.

* cited by examiner

*Primary Examiner* — Sang Kim
*Assistant Examiner* — Scott Haugland
(74) *Attorney, Agent, or Firm* — Brinks Gilson & Lione

(57) ABSTRACT

A safety belt retractor for motor vehicles having a locking system controllable in a belt webbing-sensitive and/or vehicle-sensitive manner, a locking pawl (12) mounted on the belt shaft (1) which locking pawl can be moved into engagement with a housing-fixed tooth, wherein the locking system can be deactivated at least within a range of a predetermined belt extraction length, wherein a locking element (10) is provided for deactivating the locking system which locking element can be moved depending on the belt extraction length from a first position releasing the locking pawl (12) to a second position fixing the locking pawl (12).

11 Claims, 7 Drawing Sheets

SEAT BELT RETRACTOR WITH DEACTIVATABLE LOCKING SYSTEM

CROSS-REFERENCE TO RELATED APPLICATION

This application claims priority to German Patent Application No. 10 2008 052 563.4, filed Oct. 21, 2008 and PCT/EP2009/007395, filed Oct. 15, 2009.

FIELD OF THE INVENTION

The invention relates to a safety belt retractor for a motor vehicle occupant restraint system.

BACKGROUND OF THE INVENTION

From WO 2008/064870 A1, a safety belt retractor comprising a locking pawl lockable in housing-fixed teeth, the disengaging movement of which is controlled by a mass inert control disc provided with an outer tooth, is already known. The vehicle acceleration sensor and the belt webbing-sensitive control of the control disc can be deactivated at an operating range at which almost the whole safety belt is wound upon the belt shaft. Thereby, the locking system of the safety belt retractor, for example during a very fast belt webbing retraction and a subsequent sudden stop, shall be prevented from being activated unintentionally and the safety belt retractor subsequently being locked. For deactivating the vehicle acceleration sensor and the belt webbing-sensitive control of the control disc, a locking lever is provided which is mounted on the control disc of the safety belt retractor and which deactivates the vehicle acceleration sensor as well as fixes the inertial mass of the belt webbing-sensitive control in one switching position. Thereby, both sensors are deactivated by only one locking lever.

SUMMARY OF THE INVENTION

It is an object of the invention to provide a safety belt retractor with which the deactivation of the locking system is realized by preferably simple means and in a preferably reliable manner.

For the solution of the object, it is proposed by the invention that a locking element is provided for deactivating the locking system, which locking element can be moved depending on the belt extraction length from a first position releasing the locking pawl to a second position fixing the locking pawl.

The idea of the invention is that the locking pawl itself is fixed so that the same cannot perform the disengaging movement required for locking the safety belt retractor. By directly fixing the locking pawl itself, the part effecting the locking of the belt shaft is directly locked, whereby the number of the meshing parts required for deactivating the locking system is considerably reduced, and the reliability of the deactivation is increased. Furthermore, the locking pawl, irrespective of the response of the sensors, is thereby reliably prevented from disengaging when the belt shaft is rotating owing to its own mass and the centrifugal forces generated thereby.

It is further proposed that the movement of the locking element from the first to the second position is controlled by a guide pin guided in a control contour and arranged on the locking element, and that the locking element is locked in the second position in the outward radial direction by the guide pin. The radial forces acting upon the locking pawl are then absorbed in the second position of the locking element by the guide pin locked in the outward radial direction, wherein the radial forces only have to be absorbed up to the magnitude to which they can occur at a fast belt webbing retraction and a subsequent sudden stop.

Alternatively, it is proposed that the movement of the locking element from the first to the second position is controlled by a guide pin guided in a control contour and arranged on the locking element, and that the control contour is formed by spaced limiting walls in the guidance area of the guide pin in the second position, and that the limiting walls are arranged in such a manner that, in case the guide pin unintentionally deflects from the second position to a third position located between the limiting walls, they force the same into the second position when the belt shaft is rotating in the belt webbing retraction direction. Basically, great radial forces occur at a fast belt webbing retraction owing to the mass of the locking pawl which forces the locking pawl in the outward direction. Thereby, it might happen that the guide pin breaks off owing to the radial forces and the disengaging movement caused thereby. By the proposed solution, the locking element can be moved from the second position to a third position between the limiting walls without the same thereby being destroyed. Subsequently, only a slight belt webbing retraction is required to force the locking element back to the second position. Furthermore, the locking pawl is thereby enabled to engage with the housing-fixed teeth at very high radial accelerations so that thereby a sort of an emergency locking is provided.

The movement of the locking element can be controlled in a cost-effective manner via a counter gear driven by the rotational movement of the belt shaft, wherein, no electronic system and no sensor technology is required.

In particular, the counter gear can be formed by a wobble disc driven by the belt shaft, which wobble disc comprises a control contour against which the locking element rests with a guide pin.

A further preferred embodiment of the invention is that a control disc comprising a control contour is provided on the belt shaft, and that the locking pawl engages with the control contour by a guide pin, and that the disengaging movement of the locking pawl into the housing-fixed teeth is effected by a relative rotation of the control disc in relation to the belt shaft, and that the locking element, in the position fixing the locking pawl, engages behind the guide pin in a locking manner. Thereby, both the disengaging movement and the locking of the locking pawl are effected via one and the same guide pin so that a direct locking of the disengaging movement results at a very simple constructional configuration.

It is further proposed that an inertial mass is provided for the belt-webbing sensitive control of the locking system, which inertial mass, at a fast belt webbing extraction, performs an inertia-caused relative movement in relation to the belt shaft, and that the locking element in the second position fixes the inertial mass in relation to the belt shaft. Thereby, in addition to the locking of the locking pawl itself, the belt webbing sensitive control is locked as well via an inertial mass, as it is commonly used, by fixing the inertial mass so that the disengaging movement forced by the relative movement of the inertial mass is not even initiated.

It is further proposed that a bearing platform is provided on the control disc on which the locking element is swivel-mounted via a bearing journal.

In this case, it is further proposed that a spring-elastic bearing arm is provided at the bearing platform and that the locking element, in the second position, rests against the spring-elastic bearing arm. The movement of the locking element from the first to the second position is dampened in a spring-elastic manner due to the locking element resting against the spring-elastic bearing arm. By appropriately dimensioning the components and fully utilizing the spring characteristic it can further be secured that the bearing arm in the second position of the locking element constantly rests against the same, wherein due to the spring characteristic also form inaccuracies can be compensated.

It is further proposed that the locking element, when moving from the second to the first position, is moved against a spring force exerted by the bearing arm. Hereby, the locking element is prevented from performing uncontrolled movements. Thus, the movements of the locking element, on the one hand, are defined by the control contour, and, on the other hand, by the bearing arm so that the locking element is clamped between the control contour and the bearing arm.

BRIEF DESCRIPTION OF THE DRAWINGS

In the following, the invention is described in more detail on the basis of a preferred embodiment. The figures show in detail.

DETAILED DESCRIPTION OF THE INVENTION

Figure 1:
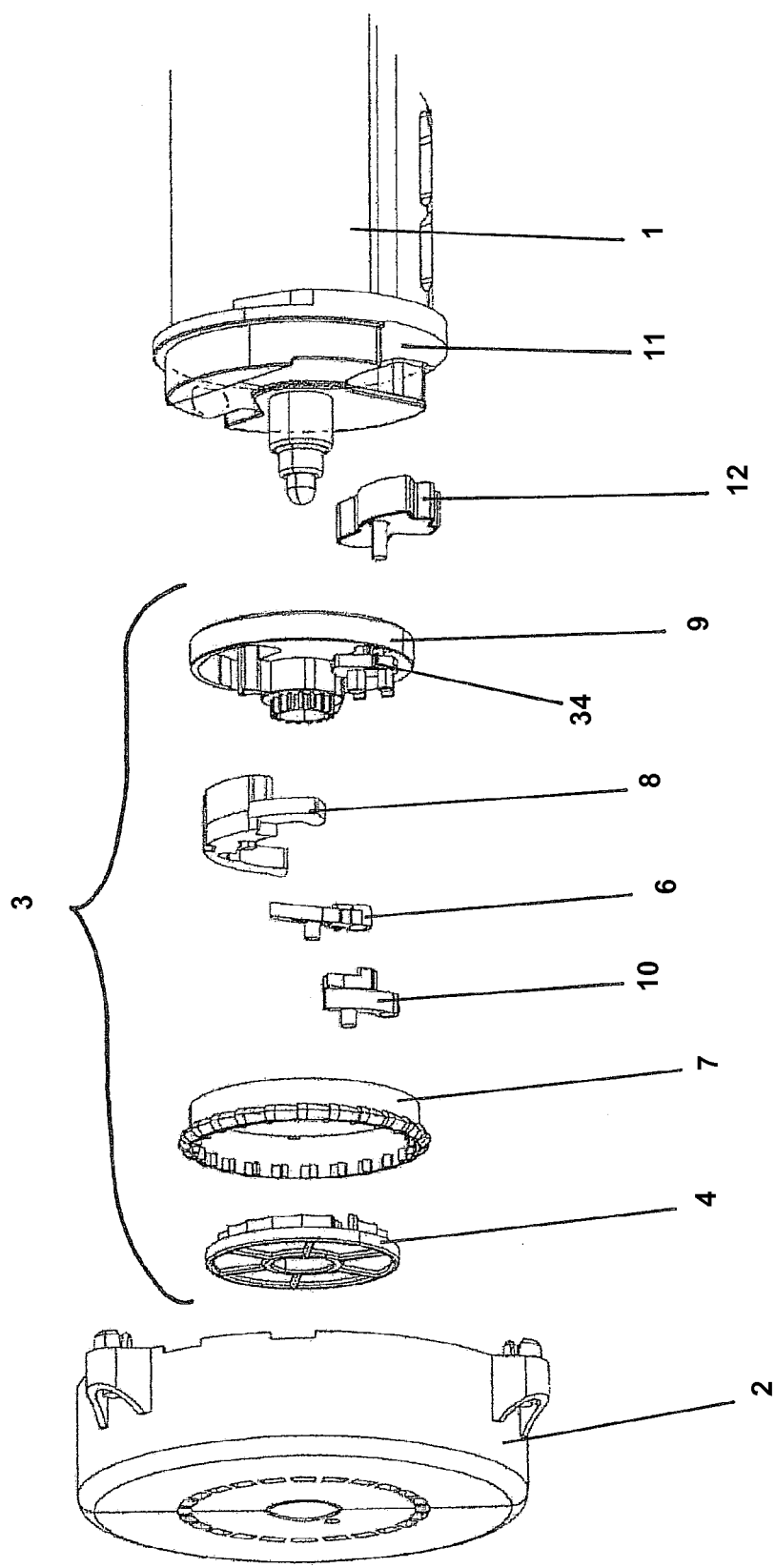
FIG. 1 shows a safety belt retractor in accordance with this invention in an exploded view.

First of all, FIG. 1 shows the safety belt retractor from the locking side in an exploded view. The safety belt retractor has a common construction consisting of a belt shaft 1, a locking system for locking the belt shaft 1 in relation to a housing of the safety belt retractor, and a housing cover 2. The locking system is formed by a locking pawl 12 discussed later arranged in a recess 11 of the belt shaft 1 and a control unit 3 for controlling the locking system. The control unit 3 is in detail formed by a control disc 9, a toothed ring 7 surrounding the same, two locking elements 6 and 10, an inertial mass 8, the function of which will be described later, and a counter gear 4 coupled to the belt shaft 1 and formed as a wobble disc.

Figure 6:
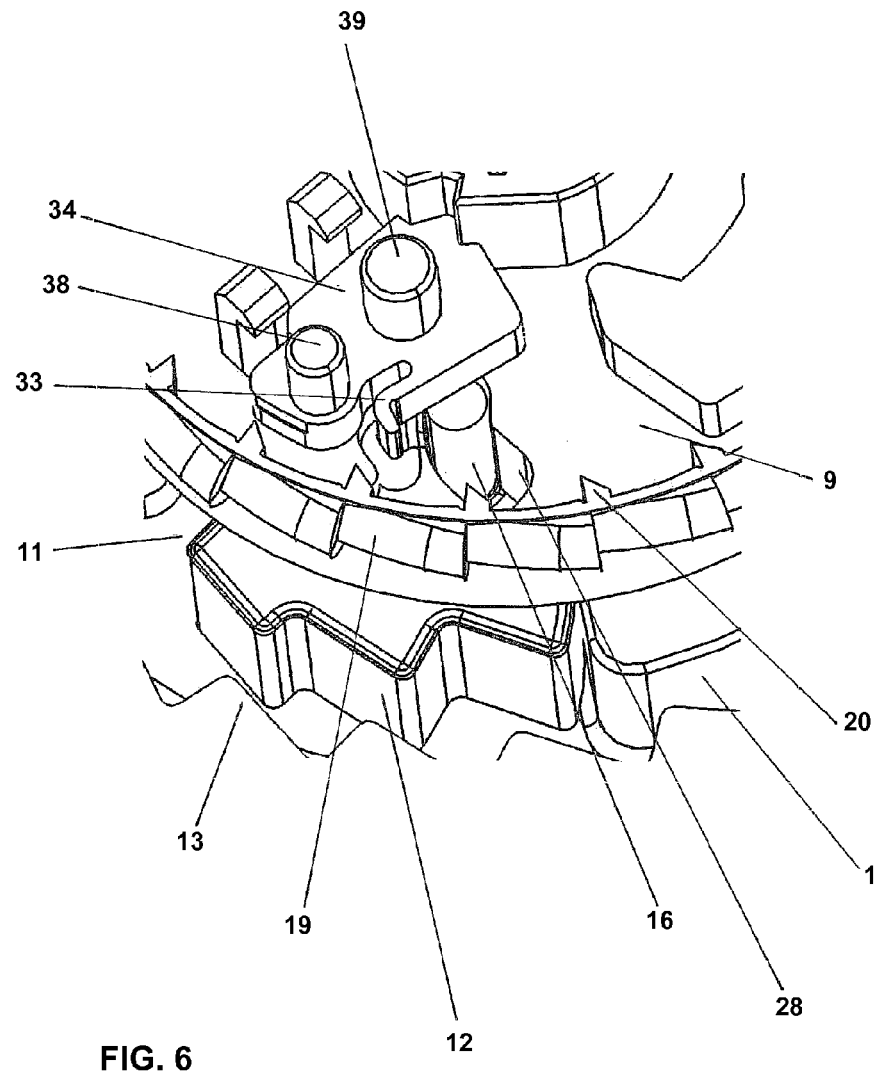
FIG. 6 shows a cut-out of the belt shaft with locking pawl and control disc.

As it can also be seen in FIG. 6, a control contour 28 is provided in the control disc 9, with which control contour a guide pin 16 assigned to the locking pawl 12 engages. In case, the control disc 9 performs a relative rotation in relation to the belt shaft 1, the locking pawl 12 is forced to perform the disengaging movement into a housing-fixed teeth 13 by the guide pin 16 engaging with the control contour 28 so that the belt shaft 1 is subsequently locked in the belt extraction direction.

Figure 2:
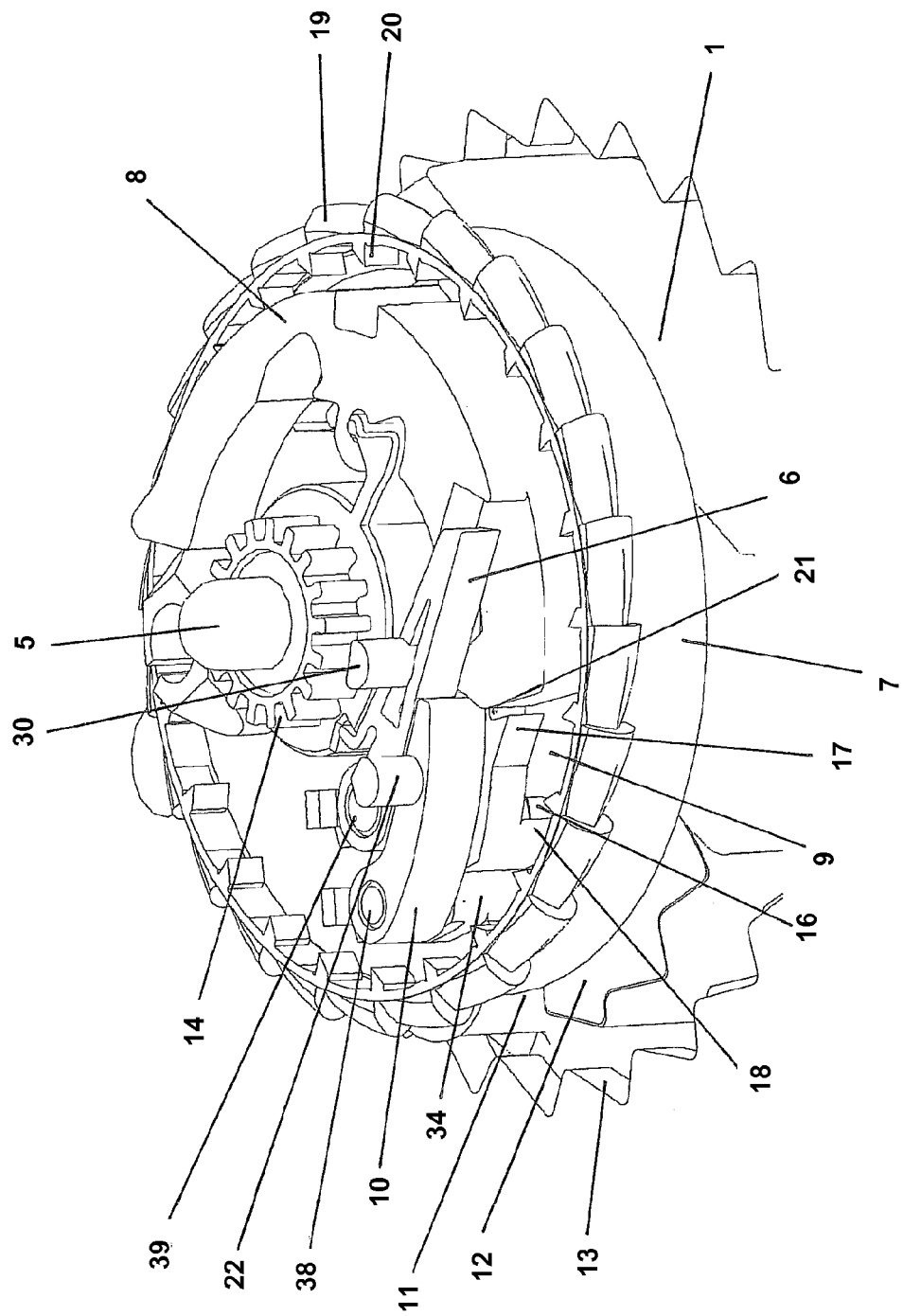
FIG. 2 shows a safety belt retractor with locking element in the second position fixing the locking pawl.
Figure 3:
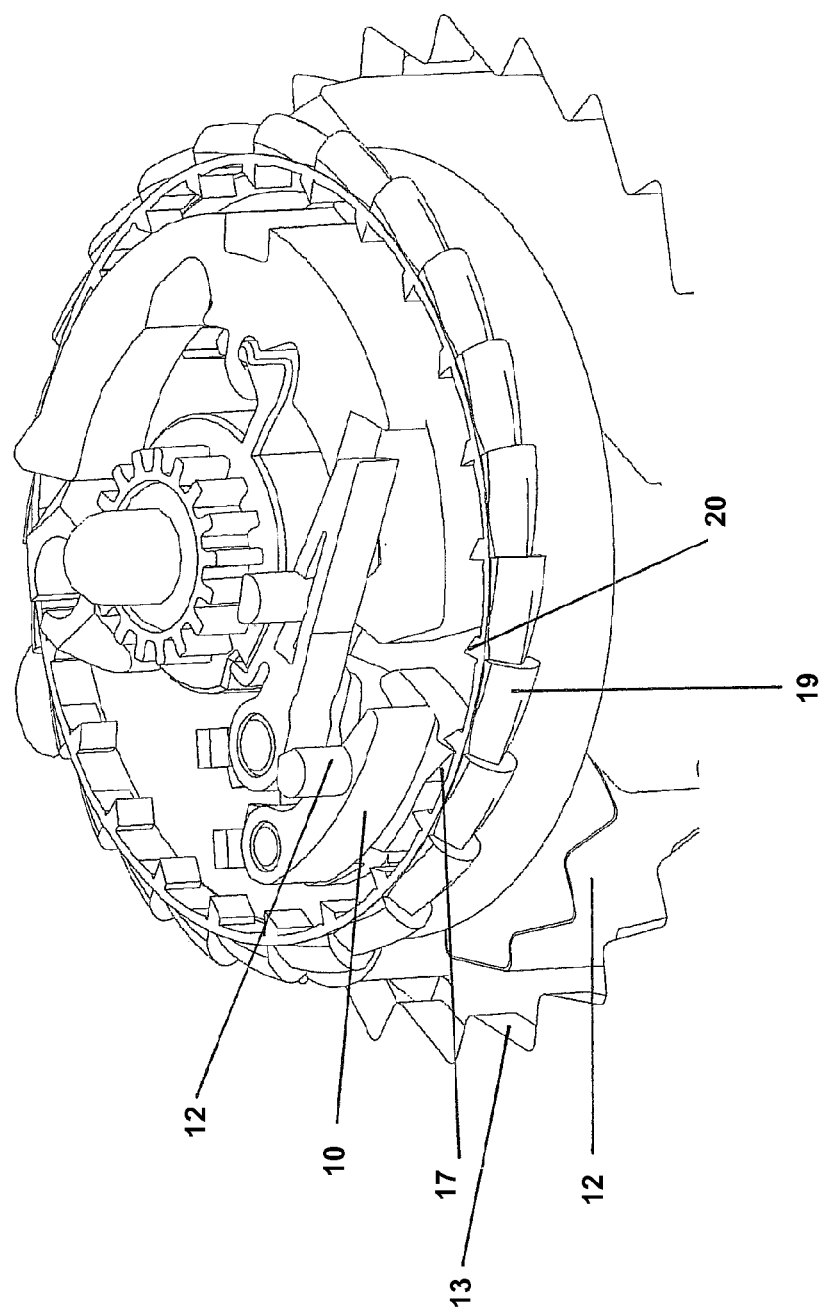
FIG. 3 shows a safety belt retractor with locking element in the first position releasing the locking pawl.

FIGS. 2 and 3 now show the control unit 3 without the counter gear 4 with activated and deactivated locking system. The toothed ring 7 comprises outer teeth 19 and inner teeth 20 which are arranged in one plane above the control disc 9. On the control disc 9, a locking element 10 and a locking element 6 are provided which engage with guide paths 23 and 31 provided at the counter gear 4 by guide pins 22 and 30. Owing to the wobbling movement of the counter gear 4 the locking element 10 and the locking element 6 are forced to a radially-directed switching movement which will be described in more detail later. Furthermore, on the control disc 9, a bearing platform 34 is provided on which the locking elements 6 and 10 are swivel-mounted via bearing journals 38 and 39. The bearing platform 34 is formed by a plane of which the bearing journals 38 and 39 stick out. It's the platform's function to guide the movement of the locking elements 6 and 10 perpendicular to the swivel axis defined by the bearing journals 38 and 39 and to mount the locking elements 6 and 10 with surface-to-surface contact between the counter gear 4 and the control disc 9.

Figure 5:
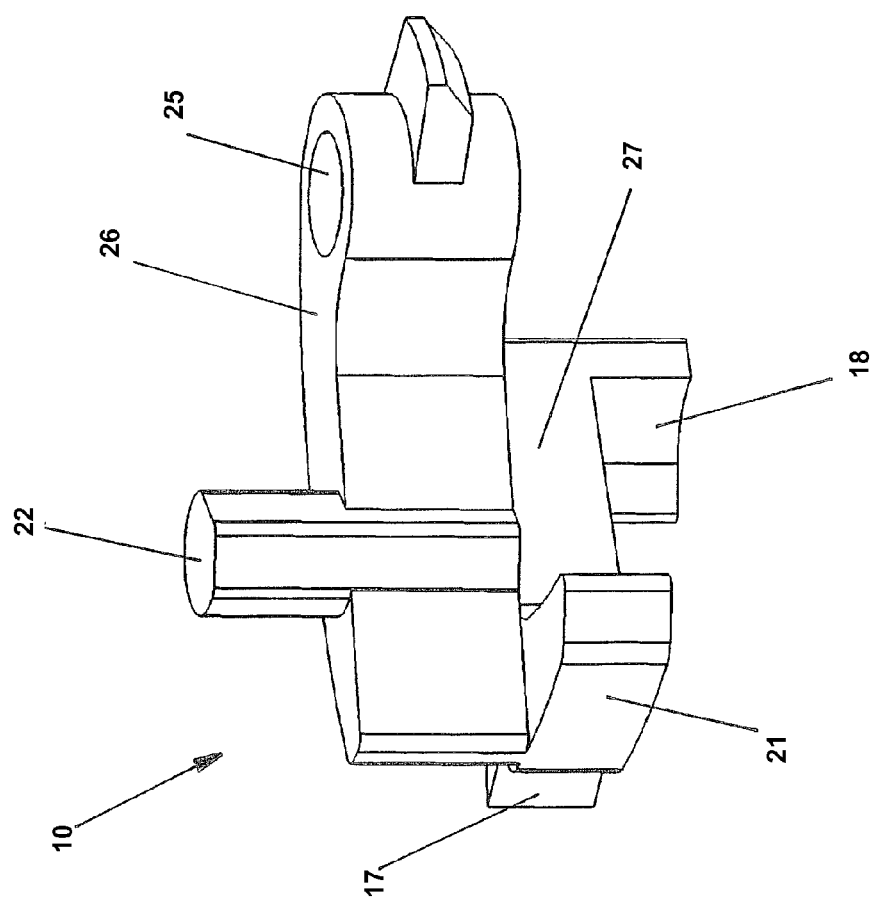
FIG. 5 shows a locking element.

FIG. 3 shows the locking element 10 in the first position where a locking pawl 12 arranged underneath is released. The locking element 10, as also can be seen in FIG. 5, has a two-part configuration with a guiding component 26 and a locking component 27 arranged underneath. In the guiding component 26, a bore 25 is provided via which the locking element 10 is swivel-mounted on the control disc 9. Furthermore, a guide pin 22 projecting upwards is provided, which guide pin controls the movement of the locking element 10 by engaging with the guide path 23 on the counter gear 4. On the locking component 27, a radially-directed tooth 17, a dog 21 and a restraint section 18 are provided.

As can be seen in FIG. 3, the locking element 10, in the position releasing the locking pawl 12, engages with the inner teeth 20 of the toothed ring 7 by the tooth 17 and thereby connects the control disc 9 to the toothed ring 7 in the circumferential direction. In this position, the safety belt retractor can be locked as described above by a vehicle-sensitive sensor not shown by a lever engaging with the outer teeth 19 and by stopping the control disc 9 in relation to the belt shaft 1. In this position, the safety belt retractor works following the conventional principle, and the locking system is activated.

In the second position of the locking element 10 swivelled in the inward radial direction shown in FIG. 2, the locking element 10 embraces the pin 16 of the locking pawl 12 extending into the control contour 28 by means of the restraint section 18 and, thereby, prevents the locking pawl 12, at a very fast belt webbing retraction, from unintentionally moving into engagement with the housing-fixed teeth 13 owing to its own mass and/or to slight relative rotational movements between the belt shaft 1 and the control disc 9. Additionally, a dog 21 is provided on the locking component 27 of the locking element 10, which dog, in the position shown in FIG. 3, engages behind the inertial mass 8 and, thus, prevents the relative movement of the inertial mass 8 in relation to the belt shaft 1 and, thereby, the belt webbing-sensitive control of the locking system. Furthermore, the tooth 17 is not engaging with the inner teeth 20 so that the connection between the toothed ring 7 and the control disc 9 is disconnected. Additionally, the vehicle-sensitive sensor is deactivated thereby, as the control disc 9, even in case, the locking lever of the vehicle-sensitive sensor engages with the outer teeth 19, is not stopped.

Besides the locking element 10, a second locking element 6 is further provided having the function to switch the safety belt retractor between an automatic locking retractor (ALR) function and an emergency locking retractor (ELR) function. The locking element 6 is also swivel-mounted on the control disc 9 and performs a radially-directed switching movement by a guide pin 30 engaging with a guide path 31 of the counter gear 4. In the functional position ALR, the locking element 6 engages with a housing-fixed teeth in the housing cover 2, preferably the same tooth the inertial mass 8 engages with, so that the safety belt retractor automatically locks at a belt webbing extraction movement. The switch from the ELR mode to the ALR mode is effected by first completely extracting the belt beyond a defined switching point. The switch back from the ALR mode to the ELR mode is then effected by retracting the belt, i.e. automatically when the belt is unbuckled, as soon as a predetermined belt webbing extraction length is under-run.

The locking element 10 is arranged radially on the outer surface of the locking element 6 so that the locking element 10, when switching from the first position shown in FIG. 3 to the second position shown in FIG. 2, automatically gains attachment to the locking element 6. In case the locking element 6 does not automatically switch back from the ALR position to the ELR position, the locking element 6 is additionally forced in the inward radial direction to the ELR position by the locking element 10.

Figure 4A:
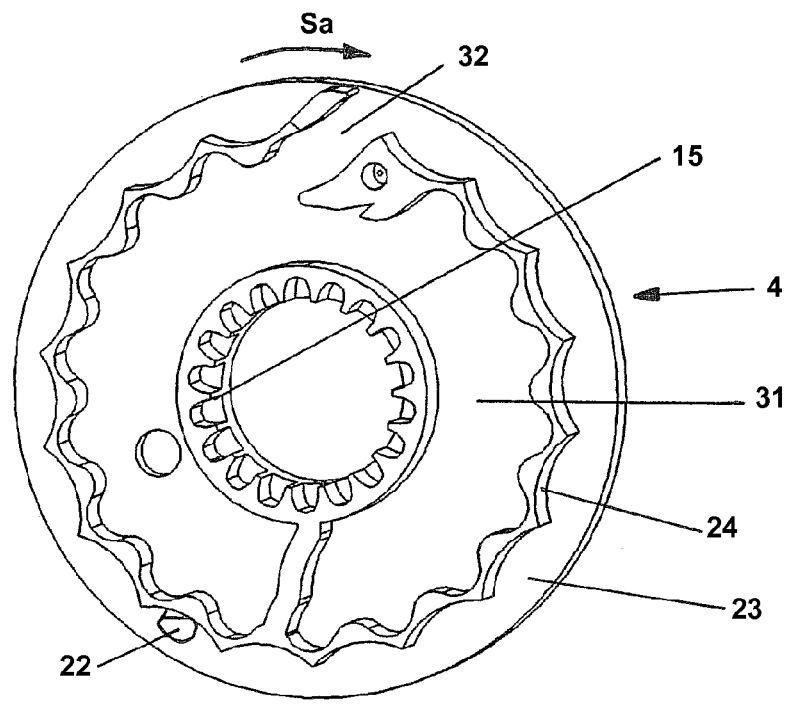
FIG. 4a shows a counter gear with control contour without apertures.
Figure 4B:
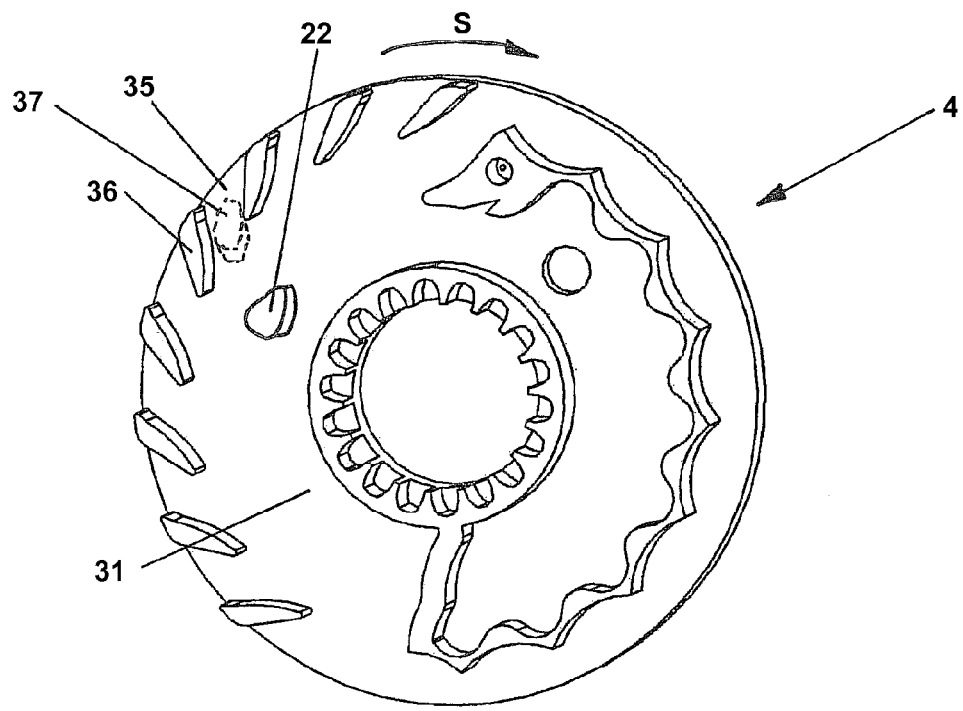
FIG. 4b shows a counter gear with control contour with apertures.

FIGS. 4a and 4b show the counter gear 4 in the form of a wobble disc which has an inner teeth 15 on its inner surface by which the same meshes with the outer tooth 14 of the control disc 9 subject to performing a wobbling movement. On the side of the counter gear 4 facing the control disc 9, a control contour 24 is provided which forms respective wave-like guide paths 23 and 31 on both sides. At the guide paths 23 and 31, the guide pins 22 and 30 of the locking elements 6 and 10 are guided so that their movement is controlled depending on the belt webbing extraction length. In the following, the movement of the locking element 10 is described in more detail, whereas the movement of the locking element 6 is not dealt with here in detail.

Based on the position shown in FIG. 4a, the counter gear 4 wobbles in the clockwise direction "S". The guide pin 22 thereby rests against the control contour 24 in the guide path 23. In this position, the locking element 10 engages with the inner teeth 20 of the toothed ring 7 by the tooth 17 and thereby establishes a connection between the toothed ring 7 and the control disc 9. When the belt webbing is retracted, the counter gear 4 wobbles in the clockwise direction so that the guide pin 22 is forced in the inward radial direction when passing through the switching point 32. In this switching point 32, the locking element 10 is forced from the first to the second position in which the same fixes the locking pawl 12 and, thereby, deactivates the locking system as a whole. Furthermore, in this position, the tooth 17 and the inner teeth 20 are disengaged so that the connection between the toothed ring 7 and the control disc 9 is disconnected, and the safety belt retractor cannot even be locked by the vehicle-sensitive locking lever engaging with the outer teeth 19.

FIG. 4b shows an alternative embodiment of the counter gear 4, wherein the control contour 24, in the area of the guide pin 22 being in the second position, is formed by spaced limiting walls 36. In case, the locking pawl 12 is exposed to very high radial accelerations so that the restraint forces exerted by the locking element 10 are exceeded, the guide pin 22 can switch to the third position referred to as 37 into the spaces 35 between the limiting walls 36 without the same thereby being destroyed. The locking system of the safety belt retractor can be activated in this position, as the locking pawl 12 is released and the toothed ring 7 is connected to the control disc 9 by the tooth 17 engaging with the inner toothed 20. The guide pin 22, in the position referred to as 37, rests against the oblique limiting walls 36 so that, subsequently, a slight belt webbing retraction and a rotation of the counter gear 4 in the clockwise direction "S" associated therewith are sufficient to force the locking element 10 via the pin 22 back to the first position.

On the whole, relating to the fixing of the locking pawl 12 via the locking element 10 it has to be stated that the restraint function of the locking pawl 12 only has to be operative up to a predetermined threshold acceleration, in order to prevent the safety belt retractor from locking unintentionally at a fast belt webbing retraction. At very high radial accelerations, of course, the locking system can lock anyway by the locking pawl 12 disengaging owing to its own mass. For this, in particular the embodiment shown in FIG. 4b is advantageous, as the spaces 35 formed by the spaced limiting walls 36 allow the locking pawl 12 including the locking element 10 to disengage without the guide pin 22 or the control contour 24 thereby being destroyed or the disengaging movement thereby being disturbed. In the embodiment of the counter gear 4 shown in FIG. 4a, the locking of the safety belt retractor is also possible, whereas, here, the locking pawl 12 disengages by overcoming the restraint forces and, if necessary, by destroying the locking element 10 and/or the control contour 24.

Figure 7:
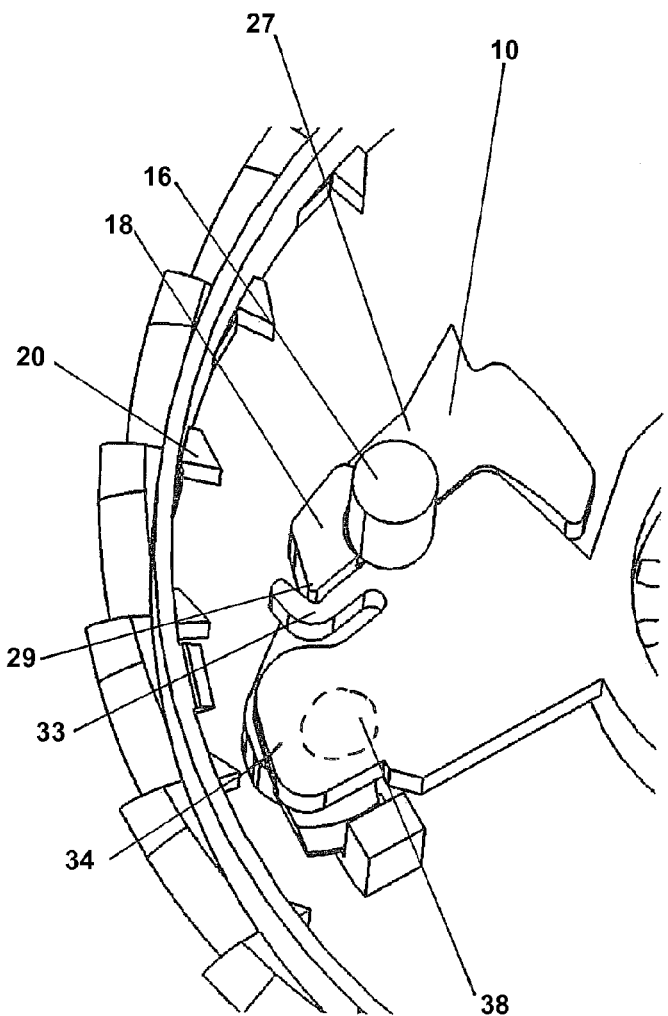
FIG. 7 shows a control disc with bearing platform and bearing arm.

FIG. 7 shows a bottom view of the locking element 10 looking in the direction of the locking component 27, wherein the latter embraces the guide pin 16 of the locking pawl 12 by the restraint section 18 and, thereby, fixes the locking pawl 12 in the second position. On the bearing platform 34, a bearing arm 33 is arranged in a spring-elastic manner, against which the locking element 10 rests with a pivot point 29. The spring-elastic bearing arm 33 causes the locking element 10 to be loaded with a counter spring force when moving from the second to the first position. Thereby, the locking element 10 is clamped between the bearing arm 33 and the inner teeth 20 during this movement so that the same cannot perform uncontrolled movements, and the guide pin 22 is held without direct contact to the control contour 24. Furthermore, the guide pin 22 is loaded with a spring force directed in the same direction when moving from the first to the second position, by which spring force the movement is supported.

While the above description constitutes the preferred embodiment of the present invention, it will be appreciated that the invention is susceptible to modification, variation, and change without departing from the fair meaning of the accompanying claims.

The invention claimed is:

1. A safety belt retractor for motor vehicles comprising a locking system configured to be deactivated at least within a range of a predetermined belt extraction length and controllable in a belt webbing-sensitive or vehicle-sensitive manner, the locking system including
   a locking pawl (12) mounted on a belt shaft (1) and configured to move into engagement with a housing-fixed tooth (13), the locking pawl having a first guide in (16) guided along a first control contour (28), and
   a locking element (10) configured for deactivating the locking system by moving, depending on a belt extraction length, from a first position releasing the locking pawl (12) to a second position fixing the locking pawl (12), the locking element (10) including a restraint section (18) configured to abut the first guide pin (16) and to prevent the first guide pin (16) from moving radially outward such that the locking pawl (12) is prevented from engaging the housing-fixed tooth (13),
   wherein the movement of the locking element (10) from the first to the second position is controlled by a second guide pin (22) guided in a second control contour (23) and arranged on the locking element (10), and that the locking element (10), in the second position, is locked from moving in an outward radial direction by the second guide pin (22) in the second control contour (23).

2. The safety belt retractor according to claim 1, wherein the movement of the locking element (10) is controlled by a counter gear (4) driven by the rotational movement of the belt shaft (1).

3. The safety belt retractor according to claim 2, wherein the counter gear (4) is formed by a wobble disc driven by the belt shaft (1).

4. The safety belt retractor according to claim 1, wherein the locking system further comprises a control disc (9) including the first control contour (28) and arranged on the belt shaft (1), the engaging movement of the locking pawl (12) into the housing-fixed tooth being effected by a relative rotation of the control disc (9) in relation to the belt shaft (1).

5. The safety belt retractor according to claim 4, wherein the locking system further comprises a bearing platform (34) on the control disc (9), on which bearing platform the locking element (10) is swivel-mounted.

6. The safety belt retractor according to claim 5, wherein the locking system further comprises a spring-elastic bearing arm (33) on the bearing platform (34), wherein the locking element (10), in the second position, rests against the spring-elastic bearing arm (33).

7. The safety belt retractor according to claim 6, wherein the locking element (10), when moving from the second to the first position, is moved against a spring force exerted by the bearing arm (33).

8. The safety belt retractor according to claim 1, wherein the locking system further comprises a first inertial mass (8) provided for the belt webbing-sensitive control of the locking system which inertial mass, at a fast belt webbing extraction, performs an inertia-caused relative movement in relation to the belt shaft (1), and that the locking element (10), in the second position, fixes the first inertial mass (8) in relation to the belt shaft (1) via a dog (21) formed on the locking element (10).

9. The safety belt retractor according to claim 1, wherein the locking element including the restraint section, the second guide pin, and a dog (21) for fixing a first inertial mass (8) are formed as one monolithic part.

10. A safety belt retractor for motor vehicles comprising a locking system configured to be deactivated at least within a range of a predetermined belt extraction length and controllable in a belt webbing-sensitive or vehicle-sensitive manner, the locking system including
a locking pawl (12) mounted on a belt shaft (1) and configured to move into engagement with a housing-fixed tooth (13), the locking pawl having a first guide pin (16) guided along a first control contour (28), and
a locking element (10) configured for deactivating the locking system by moving, depending on a belt extraction length, from a first position releasing the locking pawl (12) to a second position fixing the locking pawl (12), the locking element (10) including a restraint section (18) configured to abut the first guide pin (16) and to prevent the first guide pin (16) from moving radially outward such that the locking pawl (12) is prevented from engaging the housing-fixed tooth (13),
wherein the movement of the locking element (10) from the first to the second position is controlled by a second guide pin (22) guided in a second control contour (23) and arranged on the locking element (10), and that the second control contour (23), in a guidance area of the second guide pin (22) in the second position, is formed by spaced limiting walls (36), and that the limiting walls (36) are arranged in such a manner that they force the second guide pin (22) to a third position (37) located between the limiting walls when the guide pin is unintentionally deflecting from the second position, and the limiting walls force the second guide pin (22) to the second position when the belt shaft (1) is rotating in the belt webbing retraction direction.

11. A safety belt retractor for motor vehicles comprising a locking system configured to be deactivated at least within a range of a predetermined belt extraction length and controllable in a belt webbing-sensitive or vehicle-sensitive manner, the locking system including
a locking pawl (12) mounted on a belt shaft (1) and configured to move into engagement with a housing-fixed tooth (13), the locking pawl having a first guide in (16) guided along a first control contour (28), and
a locking element (10) configured for deactivating the locking system by moving, depending on a belt extraction length, from a first position releasing the locking pawl (12) to a second position fixing the locking pawl (12), the locking element (10) including a restraint section (18) configured to abut the first guide pin (16) and to prevent the first guide pin (16) from moving radially outward such that the locking pawl (12) is prevented from engaging the housing-fixed tooth (13),
wherein the locking system further comprises a toothed ring with inner teeth configured to be engaged by the locking element and outer teeth configured to be engaged by a locking lever of a vehicle-sensitive sensor, the locking element being disengaged from the inner teeth in the second position such that the toothed ring is rotationally decoupled from the locking element.

* * * * *

UNITED STATES PATENT AND TRADEMARK OFFICE
CERTIFICATE OF CORRECTION

PATENT NO.       : 8,752,781 B2                         Page 1 of 1
APPLICATION NO.  : 13/063556
DATED            : June 17, 2014
INVENTOR(S)      : Guillem Aranda et al.

It is certified that error appears in the above-identified patent and that said Letters Patent is hereby corrected as shown below:

In the Claims

Column 6, Claim 1, Line 50, after "guide" delete "in" and insert --pin--.

Column 8, Claim 11, Line 30, after "guide" delete "in" and insert --pin--.

Signed and Sealed this
Sixteenth Day of September, 2014

Michelle K. Lee
*Deputy Director of the United States Patent and Trademark Office*